O. F. R. BROMBERG.
TIRE VALVE.
APPLICATION FILED DEC. 2, 1915.

1,249,591.

Patented Dec. 11, 1917.

Inventor.
Oscar F. R. Bromberg.
By A. B. Bowman
Atty.

UNITED STATES PATENT OFFICE.

OSCAR F. R. BROMBERG, OF SAN DIEGO, CALIFORNIA.

TIRE-VALVE.

1,249,591.  Specification of Letters Patent.  Patented Dec. 11, 1917.

Application filed December 2, 1915. Serial No. 64,719.

*To all whom it may concern:*

Be it known that I, OSCAR F. R. BROMBERG, a citizen of the United States, residing at San Diego, in the county of San Diego and State of California, have invented certain new and useful Improvements in Tire-Valves, of which the following is a specification.

My invention relates to valves for pneumatic tires for allowing the introduction of air into said tires and for preventing its exit therefrom, and the objects of my invention are: first, to provide a valve of this class which provides a double seal for preventing the exit of the air therethrough; second, to provide a valve of this class which eliminates the necessity of a spring of any kind; third, to provide a valve of this class which is very simple, economical of construction, durable and will not readily get out of order; fourth, to provide a valve of this class, the rubber gaskets of which may be cut from ordinary rubber tubing, thus reducing the cost of manufacture to a minimum, and fifth, to provide a valve of this class which is applicable to the conventional tire stem now in use.

Figure 1:
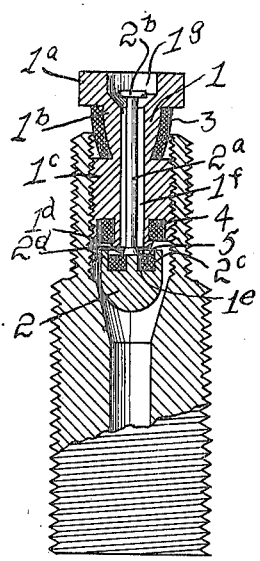
Figure 2:
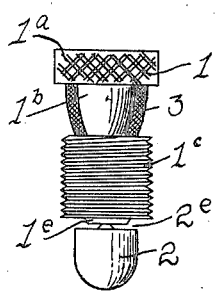
Figure 3:
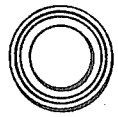

With these and other objects in view as will appear hereinafter my invention consists of certain novel features of construction, combination and arrangement of parts as will be hereinafter described in detail, and particularly set forth in the appended claims, reference being had to the accompanying drawings and to the characters of reference thereon which form a part of this specification, in which:

Figure 1 is a sectional view of a valve stem showing my valve mounted therein in its open position. Fig. 2 is a side elevational view of the valve showing one of the gaskets in section to facilitate the illustration, and Fig. 3 is a bottom view thereof.

Similar characters of reference refer to similar parts throughout the several views.

The main valve element 1, movable valve element 2, gasket 3, gasket 4, and gasket 5 constitute the principal parts of my valve.

The main valve element 1 is provided with a large portion at its top end $1^a$ provided with a knurled outer surface to facilitate the turning of this main portion into the valve stem. Just below this enlarged portion $1^a$ is a reduced, curved, tapering portion $1^b$ over which is mounted the elastic gasket 3 which is preferably rubber. Immediately below this portion $1^b$ is an enlarged portion $1^c$ which is threaded on its outer surface adapted to fit into the conventional tire stem. In the lower end of this portion $1^c$ is an elastic gasket 4 preferably rubber which acts as one of the valve seats and it is held in position by means of the shoulders $1^d$. The lower end of this main piece is provided with an edge $1^e$ adapted to seat against the gasket 5 in the movable piece 2. This main valve piece 1 is also provided with a central longitudinal hole $1^f$ adapted to allow the passage of the air therethrough, and the upper end of this hole is enlarged providing a recess $1^g$. In the hole $1^f$ is mounted so as to reciprocate slightly therein the valve rod $2^a$, the upper end of which is flattened at $2^b$ to regulate the drop of the movable piece 2 the flattened portion $2^b$ being larger than the hole $1^f$. In the upper surface of the movable piece 2 is provided an annular recess $2^c$ in which is mounted the elastic gasket 5 which is preferably rubber, and it is held in position by means of the shoulder $2^d$. The upper edge $2^e$ of the movable piece 2 engages with the gasket 4 and the lower edge $1^e$ of the main piece 1 engages with the gasket 5 forming a double seal valve, and the main valve piece 1 is screwed tightly into the upper end of the tire stem and the outer surface of the gasket 3 engages with the inner surface of the tire stem making a seal between said tire stem and main piece 1 when the same is screwed tightly therein.

Though I have shown and described a particular construction, combination and arrangement of parts, I do not wish to be limited to this particular construction, combination and arrangement but desire to include in the purview of my invention the construction, combination and arrangement substantially as set forth in the appended claims.

It is obvious that with this construction there is provided a double seal valve which is composed of only two metallic pieces, that there is no spring required in its operation, that the device is simple and economical of construction, durable and will not readily get out of order, that the movable portion 2 is of large area to provide sufficient pressure to hold the valve sealed without assistance, except the pressure.

Having thus described my invention what I claim as new and desire to secure by Letters Patent, is:

1. In a valve for inner tubes of pneumatic tires the combination with a tubular stem, of relatively fixed and movable valve members contained within said stem, means for maintaining an air-tight closure between the said relatively fixed member and stem, and a seat upon the opposing faces of each of said valve members arranged in substantially the same transverse plane and adapted to be simultaneously engaged by the other of said members when the valve is closed.

2. In a valve for inner tubes of pneumatic tires the combination with a tubular stem, of relatively fixed and movable valve members contained within said stem, means for maintaining an air-tight closure between the said relatively fixed member and stem, annular recesses in the opposing faces of both valve members, and suitable valve seats secured in said recesses in substantially the same transverse plane adapted to be simultaneously engaged by the other of said members when the valve is closed.

3. In a valve for inner tubes of pneumatic tires the combination with a tubular stem, of a relatively fixed valve member threaded into said stem, means for maintaining an air-tight closure between the said member and stem, a movable valve member, and seats upon the opposing faces of each of said valve members arranged in substantially the same transverse plane and adapted to be simultaneously engaged by the other of said members when the valve is closed.

4. In a valve for inner tubes of pneumatic tires the combination with a tubular stem, of a relatively fixed longitudinally perforated valve member threaded into said stem, means for maintaining an air-tight closure between the said member and stem, a movable valve member having a valve-rod projecting outwardly through the aforesaid perforation in the first-mentioned valve member, and seats upon the opposing faces of each of said valve members arranged and adapted to be simultaneously engaged by the other of said members when the valve is closed.

5. In a valve for inner tubes of pneumatic tires the combination with a tubular stem, of a relatively fixed longitudinally perforated valve member threaded into said stem, means for maintaining an air-tight closure between the said member and stem, a movable valve member having a valve-rod projecting outwardly through the aforesaid perforation in the first mentioned valve member, seats upon the opposing faces of each of said valve members, and non-registrable annular flanges, projecting oppositely from said valve members for engaging their respective seats upon the other of said valve members.

6. In a valve for inner tubes of pneumatic tires the combination with a valve stem, of an adjustable longitudinally perforated valve member within said stem, suitable packing material interposed between the outer end of said valve member and the main valve stem, a movable valve member having a valve-rod projecting outwardly through the aforesaid perforation in the first-mentioned valve member, a head upon the outer end of said rod of greater cross sectional area than that of said perforation, and a seat upon the opposing faces of each of said valve members arranged and adapted to be simultaneously engaged by the other of said members when the valve is closed.

In testimony whereof, I have hereunto set my hand at San Diego, California, this 27 day of November, 1915.

OSCAR F. R. BROMBERG.